United States Patent
Ono

(10) Patent No.: US 7,577,766 B2
(45) Date of Patent: Aug. 18, 2009

(54) METHOD FOR CONTROLLING ELECTRONIC APPARATUS, PROGRAM FOR CONTROLLING ELECTRONIC APPARATUS, ELECTRONIC APPARATUS, AND RECORDING APPARATUS

(75) Inventor: Takashi Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 11/637,077

(22) Filed: Dec. 12, 2006

(65) Prior Publication Data

US 2007/0150072 A1  Jun. 28, 2007

(30) Foreign Application Priority Data

Dec. 22, 2005  (JP) ............................. 2005-370735

(51) Int. Cl.
*G06F 3/00* (2006.01)
*G06F 13/00* (2006.01)

(52) U.S. Cl. ............................. 710/14; 710/8; 710/15; 710/16

(58) Field of Classification Search .................. None
See application file for complete search history.

(56) References Cited

U.S. PATENT DOCUMENTS 6,583,889 B1  6/2003  Koyanagi et al. .......... 358/1.16

2002/0091938 A1*  7/2002  Hiltunen et al. .............. 713/200
2003/0212841 A1*  11/2003  Lin .............................. 710/62

FOREIGN PATENT DOCUMENTS

| JP | 6-105039 | 4/1994 |
| JP | 9-305839 | 11/1997 |
| JP | 11-242596 | 9/1999 |
| JP | 2000-155675 | 6/2000 |

* cited by examiner

*Primary Examiner*—Tariq R. Hafiz
*Assistant Examiner*—Scott Sun
(74) *Attorney, Agent, or Firm*—Fitzpatrick, Cella, Harper & Scinto

(57) ABSTRACT

A method is provided for controlling an electronic apparatus, the electronic apparatus including a USB interface that is used for connecting a USB device of a first device class in a first operation mode controlled by a first control program. The method includes reading, upon connection of a USB device of a second device class different from the first device class to the USB interface, a second control program for controlling a second operation mode from the connected USB device; and starting the second operation mode by storing in a storage unit the second control program and executing the second control program.

10 Claims, 3 Drawing Sheets

METHOD FOR CONTROLLING ELECTRONIC APPARATUS, PROGRAM FOR CONTROLLING ELECTRONIC APPARATUS, ELECTRONIC APPARATUS, AND RECORDING APPARATUS

BACKGROUND OF THE INVENTION

1. Field of the Invention

The present invention relates to a method for controlling an electronic apparatus, the electronic apparatus including a USB interface used for connecting a USB device of a first device class in a first operation mode controlled by a first control program, a program for controlling the electronic apparatus, the electronic apparatus, and a recording apparatus.

2. Description of the Related Art

Hitherto, in an electronic apparatus controlled by a CPU (central processing unit) and a control program, a technique of using a control program for a manufacturing process in addition to a control program for a normal operation of the apparatus has been known.

Among these control programs, the control program for an application is provided to a user of the electronic apparatus, operates in a user mode under a user environment, and controls an original operation of the apparatus.

On the other hand, the control program of a factory mode is used for the purpose of operating the apparatus in a so-called factory mode in a process of manufacturing, testing, inspecting, or repairing, so as to determine the status of hardware/software of the apparatus. Also, the control program of the factory mode has a function of checking hardware/software of the apparatus or supporting an operation performed by an operator, and is used to reliably and easily perform a manufacturing process.

As described above, in a known configuration of an electronic apparatus, a user mode as a first operation mode and a second mode used for manufacturing, testing, inspecting, or repairing are provided. Assuming that the second mode is different from the first mode which performs an original operation of the apparatus, the second mode includes a mode that can execute a hidden command for a power user as well as the above-described applications.

According to a known art, control programs of the first and second modes are shipped while being stored in a program memory represented by a ROM. Such a configuration is also adopted in an inkjet printer, for example (Japanese Patent Laid-Open Nos. 09-305839, 11-242596, and 2000-155675).

Hereinafter, a case where the control programs of the first and second modes are control programs of the above-described user mode and a factory mode is discussed.

When a product is provided with a ROM storing control programs of both the user mode and the factory mode, the factory mode is not open to general users and is not started as long as a special operation is not performed in a usual case. The product specification needs to be designed so that the factory mode is started only by a highly specialized operation (not known to the user) so that the factory mode is not executed by a user by mistake. In that case, an operation of starting the factory mode becomes complicated disadvantageously. Accordingly, the following problem occurs: providing this type of mode takes time despite a purpose of providing the factory mode in a manufacturing process that should be performed in shorter time.

Furthermore, in a configuration of storing control programs of both the user mode and the factory mode together, additional capacity in the program memory is required for storing the control program of the factory mode, which is unnecessary to the user. This causes an increase in cost of the apparatus. Of course, in this configuration, when the factory mode program is to be modified due to a modification in a manufacturing process, the entire control program needs to be redesigned even if the user mode is not modified. Accordingly, the ROM is also redesigned.

The capacity of a memory can be minimized by using the following configuration. That is, a rewritable nonvolatile memory (flash memory) is used as a program memory, a factory mode program is executed during manufacturing, and the memory is rewritten with a user mode program before shipment.

A technical idea of externally performing version upgrade of a control program already exists. Also, it is known as the most general method that a new control program is downloaded from a PC (personal computer) via a PC interface, such as a USB, in a peripheral apparatus.

This method requires a PC. Thus, a system to rewrite the control program is expensive, the operation is complicated, and rewriting takes much time, so that this method is not appropriate to a manufacturing process.

On the other hand, a method for performing version upgrade of a control program without using a PC is also suggested. For example, the above-mentioned three patent documents suggest a configuration of performing version upgrade of a control program by using a memory card. However, those known arts are based on the assumption that a rewritable nonvolatile memory such as a high-cost flash memory is used. Furthermore, when a memory card is used, a memory card interface needs to be provided to externally supply a control program.

Even if a memory card is already provided on the apparatus for other uses, adapting it for upgrade requires additional resources. Japanese Patent Laid-Open No. 06-105039 suggests a technique of storing many types of applications in a memory card, selecting a necessary application therefrom, downloading the application to a RAM of an apparatus, and operating the application. In this case, too, a memory card interface is required, and a unit and an operation to select a necessary application from among many applications stored in the memory card are required.

As described above, according to the known arts, a waste of providing an interface such as a memory card only for input/output of program data occurs. Also, even if the memory card can be used in another application, units for identifying and selecting a file in the card and a selecting operation are required.

In the above description, the case where the control programs of the first and second modes are control programs of the user mode and the factory mode, respectively, has been discussed. However, problems about operability and memory capacity are common to an electronic apparatus in which the second mode is a mode of another application.

SUMMARY OF THE INVENTION

The present invention has been made to solve the above-described problems and is directed to starting a second mode different from a user mode, e.g., a factory mode, with a simple operation, quickly performing a process of manufacturing, testing, inspecting, or repairing of an electronic apparatus, and deleting a program of the second mode from a program memory so as to reduce the required size of the program memory.

According to an embodiment of the present invention, connection of a USB device of a second device class (e.g., a mass storage class) different from a first device class (e.g., a still image class) to a USB interface is regarded as a command to start a second operation mode different from a user mode, so that the second mode can be started with a very simple operation. Accordingly, a factory mode can be easily started as the second mode, and a process of manufacturing/testing/repairing an electronic apparatus can be quickly performed. Also, a program of the second mode need not be stored along with a program of the first mode together in a storage unit, so that the capacity of the storage unit can be significantly reduced.

Further features of the present invention will become apparent from the following description of exemplary embodiments with reference to the attached drawings.

DESCRIPTION OF THE EMBODIMENTS

Hereinafter, an embodiment of the present invention is described in detail with reference to the drawings. An inkjet recording apparatus according to an embodiment is described below.

Figure 1:
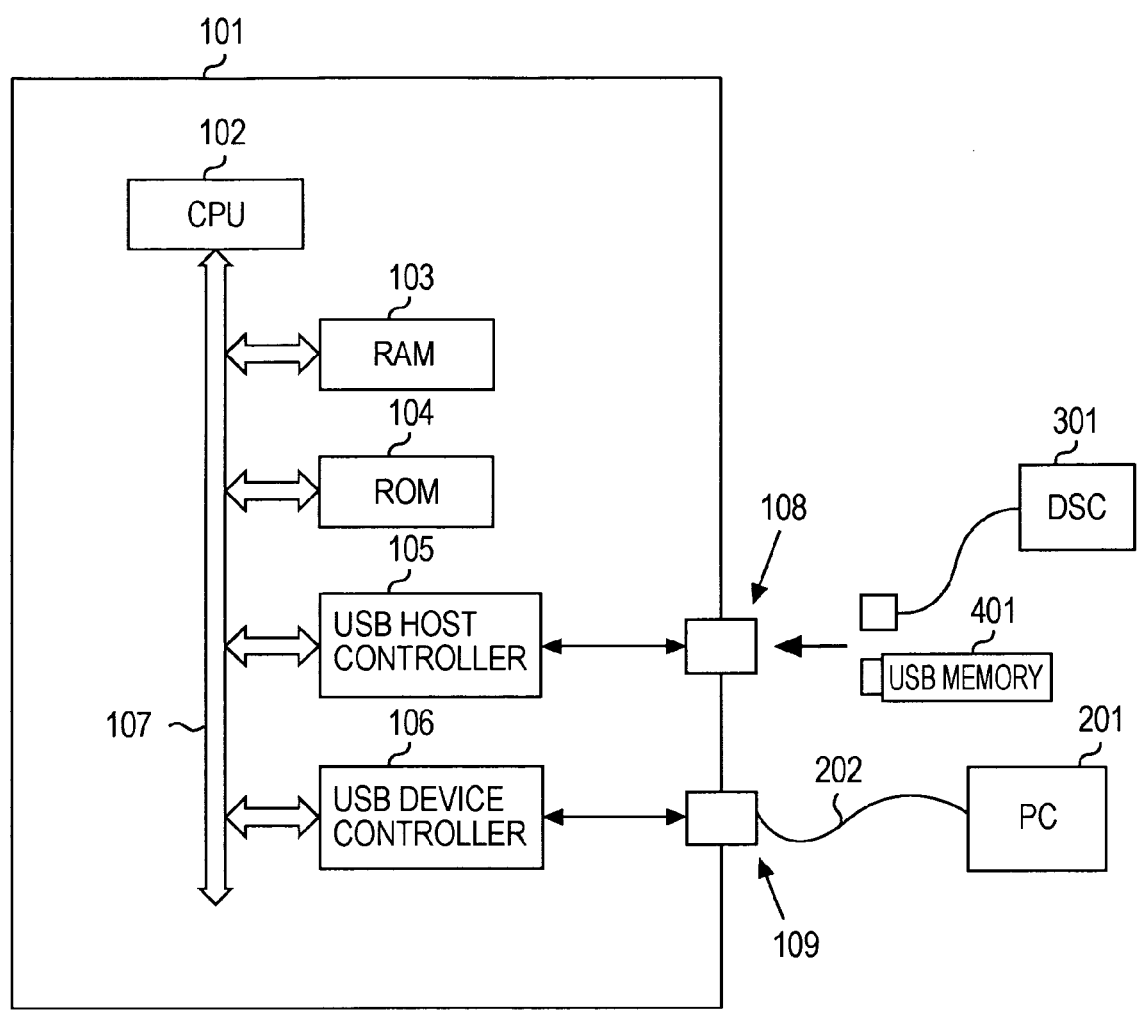
FIG. 1 is a block diagram showing a configuration of a part of an inkjet recording apparatus according to an embodiment of the present invention.

FIG. 1 shows a configuration of an essential part of the inkjet recording apparatus according to the embodiment of the present invention. In FIG. 1, the inkjet recording apparatus includes a main body 101 and a CPU (central processing unit) 102 controlling the inkjet recording apparatus.

The CPU 102 connects to a RAM (random access memory) 103, a ROM (read only memory, e.g., a nonvolatile memory or a flash ROM) 104, a USB (universal serial bus) host controller 105, and a USB device controller 106, via a system bus 107.

Among these devices, the RAM 103 is a memory used as a storage area for image data to be recorded or used for a recording process.

The ROM 104 includes a nonvolatile memory, particularly a rewritable ROM element such as a flash ROM, and is used to store a control program of a user mode for controlling the entire inkjet recording apparatus.

The CPU 102 controls the entire inkjet recording apparatus in accordance with a control program of a user mode stored in the ROM 104 (or a control program of a factory mode stored in a USB memory 401 described below). Accordingly, the CPU 102 controls a recording operation of allowing a recording unit (not shown) to record image data transmitted from a PC (personal computer) 201 connected to the inkjet recording apparatus or from a digital camera 301.

The USB host controller 105 operates as a USB host and communicates with a USB device connected to a USB connector (type-A) 108 so as to transmit/receive data.

In FIG. 1, the digital camera 301 and the USB memory 401 are shown as examples of the USB device connected to the USB connector 108.

Typically, in a printer capable of performing direct printing from this type of digital camera 301, a driver of only a still image class may be provided for a path between the USB connector 108 and the USB host controller 105.

In this embodiment, however, the USB memory 401 is connected as well as the digital camera 301. Thus, a driver compatible with a still image class and a mass storage class is provided as a driver of the USB host controller 105.

The driver of the still image class satisfies a standard of PictBridge (http://www.cipa.jp/pictbridge/) and includes DPS (digital photo solution) and PTP (picture transfer protocol) layers. The driver of the mass storage class is used to input/output a program of a factory mode (described below) and is provided with a sub-class such as SCSI (small computer system interface).

That is, the USB connector 108 to the USB host controller 105 is configured as a PictBridge interface and also as a USB interface to which a device of the mass storage class can be connected.

In the above-described configuration, the USB memory 401 is allowed to store a control program of a factory mode and the USB memory 401 is connected to the USB connector 108. Accordingly, the mode is automatically switched to the factory mode, so that the CPU 102 executes the control program of the factory mode stored in the USB memory 401.

That is, in this embodiment, the USB memory 401 can be connected to the USB interface, the USB memory 401 being a USB device of a mass storage class, which is a second device class different from the still image class as a first device class. The connection of the USB memory 401 can be regarded as a command to start a second operation mode different from a first operation mode, a control program to control the factory mode as the second operation mode can be read from the USB memory 401, and the control program can be executed.

The above-mentioned PictBridge (http://www.cipa.jp/pictbridge/) is an interface standard of connecting a recording apparatus to an apparatus such as a digital camera. The PictBridge standard is for directly connecting a recording apparatus to a digital camera via the above-described USB interface without using a host apparatus such as a PC (personal computer) so as to print images.

On the other hand, the USB device controller 106 performs USB communication with the PC 201 connected to a USB connector (Type-B) 109 via a USB cable 202 so as to transmit/receive data.

Figure 2:
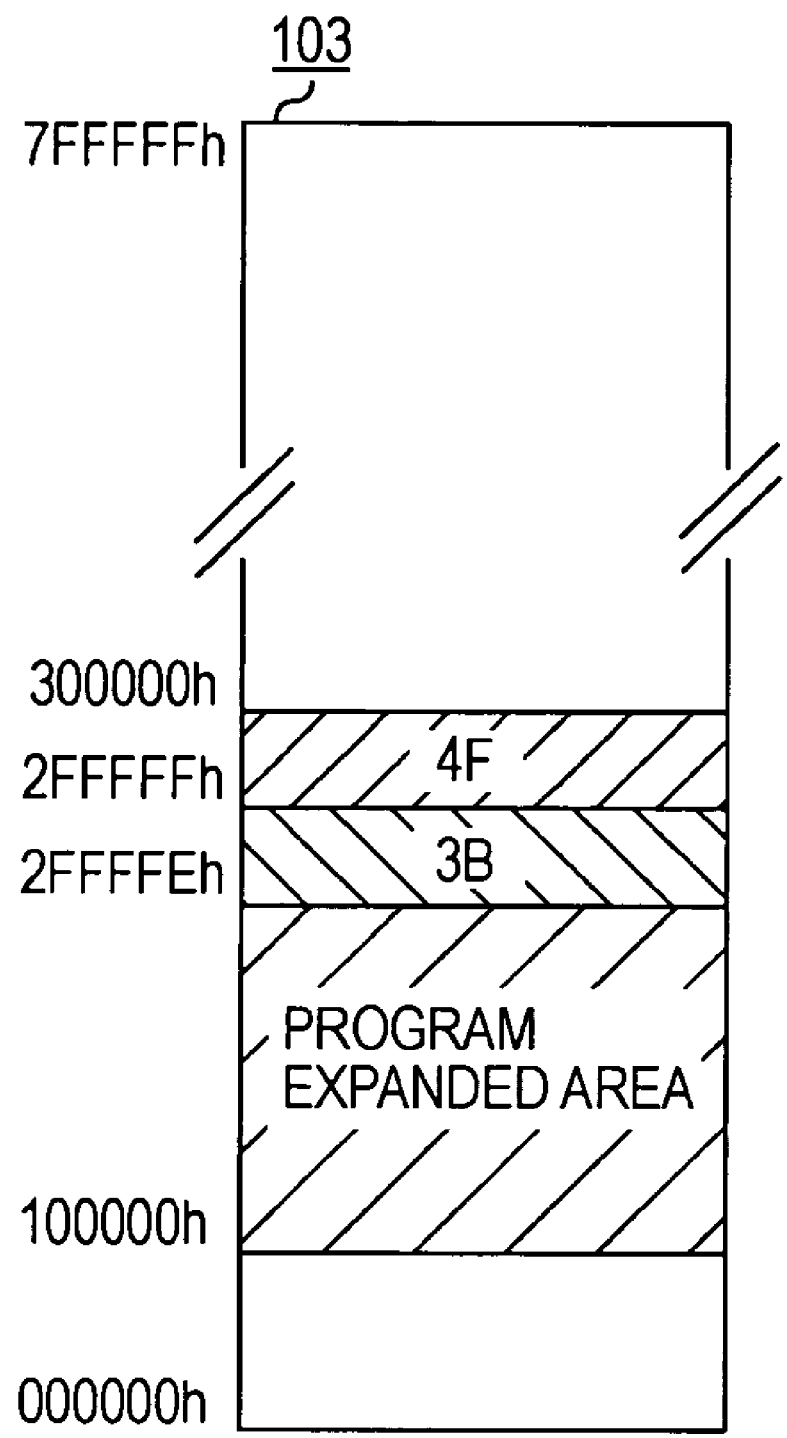
FIG. 2 is a memory map showing an example of a program expanded area of a RAM shown in FIG. 1.

FIG. 2 shows an example of using a memory space of the RAM 103 in the factory mode. In the example shown in FIG. 2, the capacity of the RAM 103 is 8 MB and the data size of the factory-mode program is 2 MB. The program code stored in the USB memory 401 is expanded from a 100000h-th address to a 2FFFFFh-th address in the RAM 103.

The control program of the user mode stored in the ROM 104 is executed in a memory space of the ROM 104 or is executed after being loaded to a memory space of the RAM 103, similar to how the control program of the factory mode is executed.

The inkjet recording apparatus shown in FIG. 1 detects connection of a USB device to the USB connector 108 while operating in accordance with the control program of the user mode stored in the ROM 104. In this way, a USB apparatus needs to be adaptable to a so-called hot-swap operation.

After the USB memory 401 of the mass storage class has been connected as a USB device, the CPU 102 reads program data stored in the USB memory 401 and expands the data in the RAM 103. After the program data has been expanded in the RAM 103, the program area expanded in the RAM 103 is accessed and an operation is performed in accordance with the program code stored in the RAM 103, that is, the factory-mode program.

Hereinafter, control of shifting to the above-described factory mode is described with reference to the flowchart shown in FIG. 3. The control process shown in FIG. 3 can be stored in the ROM 104 as a firmware of the apparatus.

In the above description, the control program of the first mode to control an original operation is distinguished from the control program of the second mode dealt by a manufacturer or a serviceman, such as an operation mode of manufacturing/testing/repairing, by modifiers "user-mode" and "factory-mode".

However, in order to prevent that the scope of the present invention is limited by those modifiers "user-mode" and "factory-mode", those modes are referred to also as a first mode and a second mode in the following description. For example, the control program of the second mode need not always be a mode for a manufacturer or a serviceman, but may be a control program of an expanded mode executed by a user.

Figure 3:
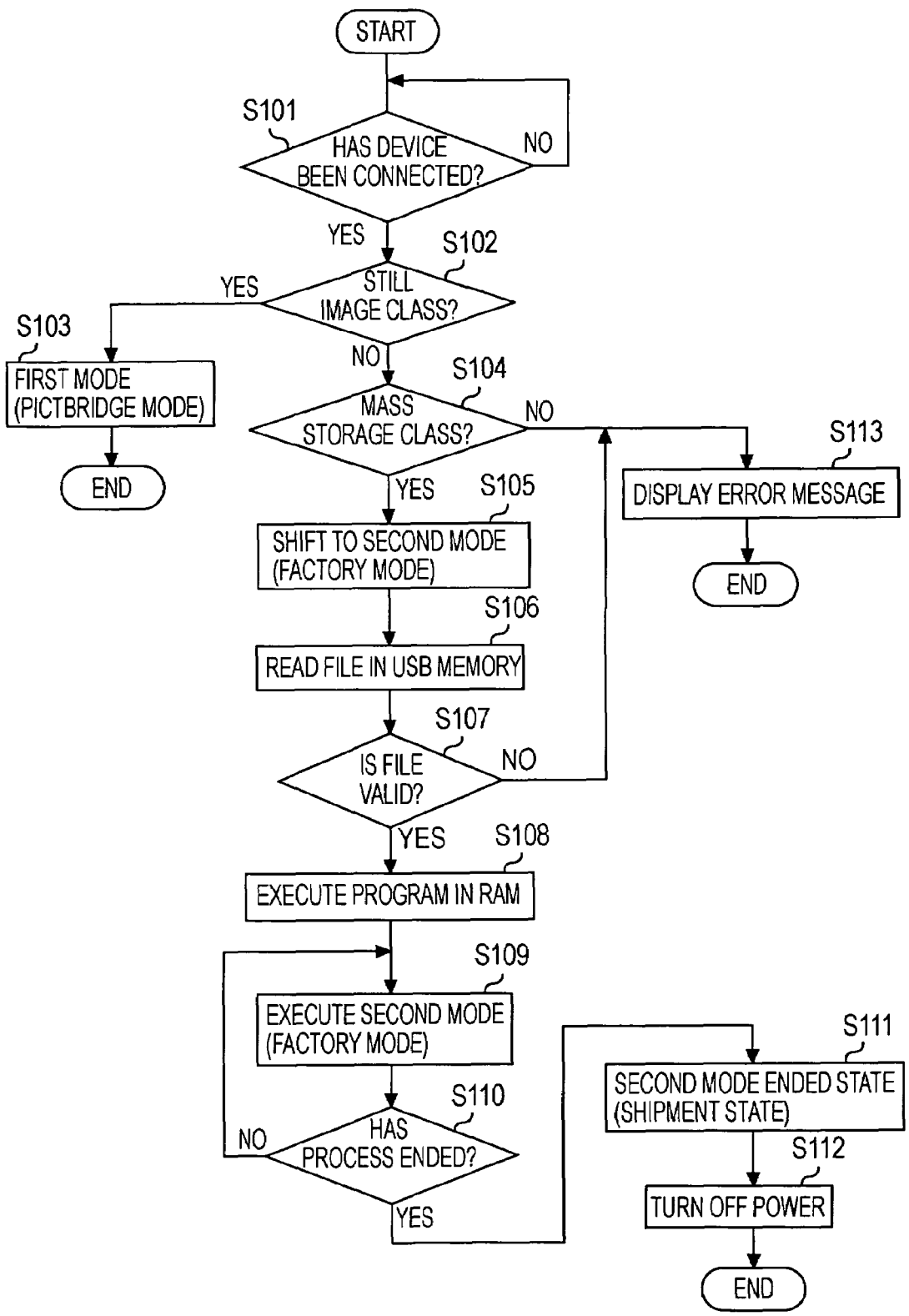
FIG. 3 is a flowchart showing a control process performed by the inkjet recording apparatus shown in FIG. 1.

Referring to FIG. 3, after a USB device has been connected to the USB connector 108 in step S101, the device class of the connected USB device is determined by a bus enumeration in steps S102 and S104.

If it is determined in step S102 that the device class of the detected USB device is a still image class, the USB device is determined to be a digital camera (301) and the process proceeds to step S103, where a process of a PictBridge mode is performed as an operation of the first mode. In step S103, recording of image data stored in the digital camera is performed, for example.

If the device class of the detected USB device is not the still image class, whether the device class is a mass storage class is determined in step S104. If the device class is not the mass storage class, that means an unexpected device has been connected. In that case, an error massage is displayed in step S113 and the process ends.

If it is determined in step S104 that the device class of the USB device is the mass storage class, the second mode, that is, the factory mode, is to be performed, so that the process proceeds to step S105 so as to shift to the second mode.

In step S106, a program file of the second mode (factory mode) stored in the USB memory 401 is read and is expanded as a program code in the predetermined area (FIG. 2) of the RAM 103. In the example shown in FIG. 2, the program code is sequentially stored from the 100000h-th address of the RAM 103.

The program file stored in the USB memory 401 may be a file of a text data format that has already been expanded to a program code or may be a file of a packet format attached with CRC check data of an msx file format. In the latter case, the program file is expanded in the RAM after converting it to a simple program code by using a program stored in the ROM 104.

In step S107, it is determined whether the data expanded in the RAM 103 is a valid program code.

Specifically, a predetermined ID value is set in advance at a predetermined address of the ROM 104, and the predetermined ID value is compared with a value written in a predetermined address of the data expanded in the RAM 103 in step S106. If the value matches with the predetermined ID value, it is determined that the program code is valid.

For example, in the memory map shown in FIG. 2, the 2FFFFEh-th address and the 2FFFFFh-th address are regarded as data addresses for checking a program loaded. Also, values "3B" and "4F" are stored in the 2FFFFEh-th address and the 2FFFFFh-th address, respectively, as data for checking the valid second mode program.

Therefore, if it is determined in step S107 that those address values are "3B" and "4F", the program code is determined to be valid and the factory mode is performed. However, if the address values are other values, an error message is displayed and the process ends.

As described above, according to the process of comparing the ID values expanded in the RAM 103, the validity of the control program can be determined very easily.

Alternatively, a checksum or an MD five-value of the entire valid program code may be calculated and may be compared with the value stored in the ROM 104 in advance in order to reliably determine whether the program loaded from the USB memory 401 is a valid program that can be executed.

The valid program code that can be executed need not be single, but a plurality of types of program codes may be used. For example, a plurality of second mode control programs for inspection, maintenance, and power users may be prepared. In order to permit execution of these programs, the above-described ID value, checksum, and MD five-value may be stored in the ROM 104 for corresponding programs.

If it is determined in step S107 that the program loaded from the USB memory 401 is a program code of the second mode that can be executed, the process proceeds to step S108. In step S108, a predetermined address of the program code expanded in the RAM 103 is accessed so as to start the program of the second mode. After that, the inkjet recording apparatus operates in accordance with the program code of the second mode expanded in the RAM 103.

If it is determined in step S107 that the program file is not valid, the file is determined to be wrong. In this case, the process proceeds to step S113, where an error message is displayed and the process ends without proceeding to the second mode.

Alternatively, if it is determined in step S107 that the program file is not valid, the USB memory 401 may be accessed as a mass storage device instead of proceeding to step S113.

Note that, if the USB memory 401 should be operated simply as a memory device for a user by the inkjet recording apparatus, the USB memory 401 may be mounted in the still image class. In that case, the USB memory 401 can be dealt with in the first mode (PictBridge mode) in steps S102 to S103.

In step S109, the control program of the second mode is executed. Accordingly, an operation necessary for a desired process is performed by an operator, so that the desired process proceeds.

In step S110, it is determined whether the process of the control program of the second mode is to be ended (e.g., whether the entire manufacturing process is to be ended). Then, the inkjet recording apparatus proceeds to step S111 by a predetermined operation, so as to shift to a state where the control program of the second mode has been ended (shipment state).

Determination of end in step S110 may be made based on detection of a predetermined key input to an operation unit. Alternatively, the process may automatically proceed at the time when all operations to be performed are complete. Alternatively, the end may be determined when the USB memory 401 is disconnected from the USB connector 108.

After the second mode has ended (e.g., after shipment state of the inkjet recording apparatus has been set), the power is turned off in step S112. If the second mode relates to a manufacturing process, the apparatus is immediately brought into a packing-standby state.

In the above-described manner, the control program of the second mode can be executed very easily without performing any other operations only by connecting the USB memory 401 that is mounted as a mass storage device and that stores the control program of the predetermined second mode.

That is, an electronic apparatus can be shifted to the second mode very easily without performing any other operations only by connecting the USB memory 401 as a mass storage device to the USB interface 108 for PictBridge.

Therefore, in a control program having a factory mode as a second mode, the second mode need not be started by a special operation, so that the operation of the manufacturing process (or testing or repairing process) can be performed very easily.

According to the above-described embodiment, the control program of the second mode need not be stored in the ROM 104, alongside the control program of the first mode, so that the memory capacity of the ROM 104 can be saved and the manufacturing cost can be reduced accordingly.

In the above-described embodiment, predetermined address data of the data expanded in the RAM is checked in step S107 in order to determine whether the data stored in the USB memory is a program code. Alternatively, before a file is read from the USB memory 401 in step S106, it may be determined whether the file format stored in the USB memory 401 is a file format storing a program code. Since the head of a program file of many execution formats is configured in a predetermined format (e.g. including predetermined magic data), whether a program is a valid program that can be executed may be determined by using this configuration.

In this embodiment, connection of the USB memory mounted as a mass storage device to the USB interface for PictBridge serves a command to shift to the factory mode. Thus, if the product specification disallows the possibility of connection of a mass storage device containing another application while in a user environment, the determination sequence in step S107 can be omitted. That is, in this embodiment, shift to the factory mode can be determined very easily by using only information essential to USB communication.

Furthermore, in this embodiment, a USB communication driver mounted for the USB interface (the USB host controller 105 to the USB connector 108) may be compatible with only the still image class and the mass storage class. Thus, a USB driver software is simplified.

Furthermore, even if the control program of the second mode (e.g., the factory mode) is to be modified, only the control program of the second mode can be modified without causing an effect on a program memory of the user mode.

The control program of the second mode is expanded in the RAM 103 and is automatically erased from the RAM 103 upon power-off. Thus, the user mode is not affected at all.

In the above-described embodiment, whether the mode is the PictBridge mode or the factory mode is determined based on a device class. Alternatively, the determination can be made based on other information of a device descriptor, e.g., a device type.

In the above-described embodiment, the factory mode is used as the second mode. However, any other modes causing an operation different from that of the user mode can be used as the second mode. For example, if a control program for a maintenance check of the apparatus is prepared and is stored in the USB memory, a serviceman can easily perform a maintenance check in the market, and a program necessary for the maintenance check can be deleted from a user mode program. Of course, the second mode may be an operation mode controlled by an expansion program for a power user.

Also, a firmware of the apparatus that includes the control process shown in FIG. 3 and that is stored in the ROM 104 can be updated by using the control program of the second mode stored in the USB memory 401.

For this purpose, the control program of the second mode is configured on the basis of a binary image of the firmware of the apparatus including the control process shown in FIG. 3 and a writing program of writing the binary image in a predetermined area of the ROM 104 (of course configured by a flash memory in this case), and the writing program is started as the control program of the second mode when the USB memory 401 is connected. Accordingly, the firmware of the apparatus stored in the ROM 104 can be updated.

The present invention is not limited by the name of an electronic apparatus product and can be carried out in an electronic apparatus including a USB interface used for connection of a USB device of a first device class in a first operation mode controlled by a first control program. The control program according to an embodiment of the present invention, particularly the control program shown in FIG. 3, may be stored as a firmware in a ROM as described above. If the electronic apparatus includes a network interface, the control program can be supplied from an arbitrary server via a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-370735 filed Dec. 22, 2005, which is hereby incorporated by reference herein in its entirety.

What is claimed is:

1. A method for controlling an electronic apparatus, the electronic apparatus including a USB interface that is used for connecting a USB device, the method comprising the steps of:

monitoring the USB interface to determine when the USB device has been connected;

assessing whether the connected USB device is of a first device class or a second device class different from the first device class;

starting a first control program for controlling a first operation mode in a case where the assessing step finds that the connected USB device is of the first device class;

reading a second control program for controlling a second operation mode from the connected USB device in a case where the assessing step finds that the connected USB device is of the second device class, wherein the second operation mode is a factory mode to support an operator in at least one of manufacture, test, inspection, or repair of the electronic apparatus;

storing the second control program in a volatile memory of the electronic apparatus;

determining whether the second control program is a valid control program;

starting the second operation mode by using the second control program in the volatile memory and executing the second control program only in a case where the determining step determines that the second control program is a valid control program, thereby to support an operator in said at least one of manufacture, test, inspection, or repair of the electronic apparatus; and powering off the electronic apparatus after the second operation mode is finished.

2. The method according to claim 1, wherein the first device class is a still image class and the second device class is a mass storage class.

3. The method according to claim 1, wherein the determining step compares a predetermined ID value stored in the electronic apparatus with a program ID value stored in the second control program, and determines that the second control program is valid only in a case where the predetermined ID value matches the program ID value.

4. The method according to claim 1, wherein the first operation mode is a user mode to perform an original operation of the electronic apparatus.

5. The method according to claim 1, wherein the determining step calculates a checksum value of the entire second control program, compares the calculated checksum value with a predetermined checksum value stored in the electronic apparatus, and determines that the second control program is valid only in a case where the predetermined checksum value matches the calculated checksum value.

6. The method according to claim 1, wherein the determining step calculates an MD five-value of the entire second control program, compares the calculated MD five-value with a predetermined MD five-value stored in the electronic apparatus, and determines that the program is valid only in a case where the predetermined MD five-value matches the calculated MD five-value.

7. The method according to claim 1, wherein the determining step examines a file format of the second control program, and determines that the second control program is valid only in a case where the file format is a file format storing a program code.

8. A computer-readable storage medium storing a computer-executable program for controlling an electronic apparatus including control software to execute the method for controlling an electronic apparatus according to any one of claims 1 to 4 or 5 to 7.

9. An electronic apparatus including hardware to execute the method according to any one of claims 1 to 4 or 5 to 7.

10. A recording apparatus comprising:
a USB interface to which a USB device of a still image class is connected in a first operation mode and to which a USB device of a mass storage class is connected in a second operation mode, the USB interface serving as hardware to execute the method for controlling an electronic apparatus according to any one of claims 1 to 4 or 5 to 7,
wherein the recording apparatus records and outputs image data stored in the USB device connected in the first operation mode.

* * * * *